United States Patent
Pothier et al.

(10) Patent No.: US 12,554,016 B2
(45) Date of Patent: Feb. 17, 2026

(54) METHOD OF DETECTING PRESENSE OF AN OBJECT USING A TIME OF FLIGHT SENSOR

(71) Applicants: STMicroelectronics France, Montrouge (FR); STMicroelectronics (Research & Development) Limited, Marlow (GB); STMicroelectronics, Inc., Coppell, TX (US)

(72) Inventors: Olivier Pothier, Sceaux (FR); Philippe Legeard, Sunnyvale, CA (US); Donald Baxter, Stirling (GB); Edward Hawkins, Edinburgh (GB)

(73) Assignees: STMicroelectronics France, Montrouge (FR); STMicroeletronics Inc., Coppell, TX (US); STMicroelectronics (Research & Development) Limited, Marlow (GB)

( * ) Notice: Subject to any disclaimer, the term of this patent is extended or adjusted under 35 U.S.C. 154(b) by 1074 days.

(21) Appl. No.: 17/554,825

(22) Filed: Dec. 17, 2021

(65) Prior Publication Data

US 2022/0196834 A1     Jun. 23, 2022

Related U.S. Application Data

(60) Provisional application No. 63/127,660, filed on Dec. 18, 2020.

(51) Int. Cl.
*G01S 17/08* (2006.01)

(52) U.S. Cl.
CPC ..................... *G01S 17/08* (2013.01)

(58) Field of Classification Search
CPC ........... G01S 17/08; G01S 17/10; G01S 7/487
See application file for complete search history.

(56) References Cited

U.S. PATENT DOCUMENTS

| | | | |
|---|---|---|---|
| 11,598,678 B1 * | 3/2023 | Moslehi | G01K 11/32 |
| 2019/0056497 A1 * | 2/2019 | Pacala | G01S 7/497 |
| 2020/0271765 A1 * | 8/2020 | Glover | G01S 7/4876 |

* cited by examiner

*Primary Examiner* — Catherine T. Rastovski
(74) *Attorney, Agent, or Firm* — Slater Matsil, LLP

(57) ABSTRACT

A method can be used to detect the presence an object within a field of view of a time-of-flight sensor. A histogram generated by the time-of-flight sensor is obtained. The histogram includes a number of bins associating a number of detected photons to a given acquisition time. A portion of the bins of the histogram is transformed into points in a transformed domain that features a first area containing only points associated to bins representative of the presence of the object and a second area having only points associated to bins not representative of the presence of the object. The bins of the histogram representative of the presence of the object are identified from the points located in the first area.

20 Claims, 4 Drawing Sheets

METHOD OF DETECTING PRESENSE OF AN OBJECT USING A TIME OF FLIGHT SENSOR

CROSS-REFERENCE TO RELATED APPLICATIONS

This application claims the benefit of U.S. Provisional Application No. 63/127,660, filed on Dec. 18, 2020, which application is hereby incorporated herein by reference.

TECHNICAL FIELD

Embodiments and implementation modes relate to time-of-flight sensors and, in particular embodiments, to the detection of the presence of an object(s) using a time of flight sensor.

BACKGROUND

A time-of-flight sensor is a sensor using light propagation to measure distances between objects and this sensor.

In particular, a time-of-flight sensor is configured so as to be able to emit an optical light radiation, for example of the infrared or laser type, towards an object and to measure a flight time, that is to say the time elapsed between the emission of this radiation and its reception by the sensor after reflection of the radiation on the object. Measuring the flight time allows determining the distance between the object and the sensor, knowing the speed of the radiation.

The reception of the radiation may be performed using single-photon sensitive detectors.

In particular, as single-photon sensitive detectors, there are known Single Photon Avalanche Diodes, commonly referred to by the acronym "SPAD" by persons skilled in the art.

In order to produce accurate timing information on the arrival of each individual photon originating from the optical light radiation, single-photon sensitive detectors may be adapted to generate time-series histograms of the number of photons detected during successive emission periods.

Thus, such time-series histograms are constituted by several bins each associating a number of detected photons to a given acquisition time during the emission periods.

Some bins of such histograms may be representative of photons originating from the radiation reflected by an object. Hence, these bins are representative of the presence of an object within the field of view of the time-of-flight sensor. In general, these bins have a number of photons greater than a given threshold below which the number of detected photons is that one of an ambient noise.

Algorithms are then implemented to identify the bins of the histograms that are representative of photons originating from the radiation reflected by one or several object(s).

In particular, it is possible to identify the bins that are representative of the presence of an object by comparing the bins with a fixed threshold greater than or equal to the given threshold delimiting the ambient noise.

Nevertheless, these identification algorithms may turn out to be insufficient to identify all bins representative of the presence of an object.

SUMMARY

The inventors have identified that following a main bin, the histograms may comprise a dispersion of the number of detected photons over other bins. The main bin is the bin having the largest number of detected photons.

Such dispersion may cover a duration of the same order of magnitude as the emission period, and even longer. Such dispersion may distort the identification of other bins representative of photons originating from the radiation reflected by objects.

This dispersion of the number of photons may occult bins that are representative of photons originating from the radiation reflected by other objects present at other distances relative to the sensor.

Furthermore, because of this dispersion, bins that are not representative of photons originating from a radiation reflected by an object may be identified as bins representative of photons originating from a radiation reflected by an object.

Therefore, the presence of an object may be detected at a given distance while no object is actually present at this distance.

This may result in malfunctions for applications using these object presence data, such as presence detection or autofocus of a camera.

One solution is useful in identifying only the main bin representative of the presence of an object, the other bins representative of the presence of an object or whose number of photons results from the dispersion of the photons being ignored.

Nevertheless, ignoring bins that are representative of the presence of an object may be a drawback in some situations, in particular when an autofocus of a camera has to be performed throughout a window pane.

Another solution is useful in raising the comparison threshold so as to ignore bins representative of the presence of an object having a number of detected photons slightly larger than a number of detected photons originating from the ambient noise. Nevertheless, such a solution reduces the performances of objects' detection in the field of view of the sensor, in particular for low-reflective objects. Furthermore, with such a solution, the maximum object detection distance decreases.

Hence, there should be provided an effective method for detecting an object presence allowing detecting the presence of an object in a reliable way.

According to one aspect, a method is provided for detecting a presence of at least one object within a field of view of a time-of-flight sensor, the method comprises, obtaining a histogram generated by the time-of-flight sensor. The histogram comprises several bins associating a number of detected photons to a given acquisition time. At least one portion of the bins of the histogram is transformed into points in a domain, called transformed domain, featuring a first area containing only points associated to bins representative of an object presence and a second area having only points associated to bins not representative of an object presence. The bins of the histogram representative of an object presence are identified from the points located in the first area.

The transformed domain is configured so that the bins representative of the presence of an object could be distinguished more easily from the other bins.

Thus, it is possible to identify bins that are representative of the presence of an object even when these bins are occulted in the histogram by a dispersion that follows the main bin of the histogram.

It also allows avoiding considering bins that are not representative of the presence of an object but result from the dispersion that follows the main bin, as bins representative of the presence of an object.

Hence, such a method allows improving the identification of the bins representative of the presence of an object. Indeed, such a method allows avoiding confusion between the bins representative of an object and the bins having a number of photons resulting from the dispersion. Hence, such a method is more reliable. Such a method also allows improving the detection range of a time-of-flight sensor.

More particularly, a histogram is acquired over a given period. The bins of a histogram are associated to different acquisition times of the acquisition period of the histogram. The acquisition period of one histogram starts as of the time of emission of an optical radiation and lasts until a predefined number of bins is acquired.

By "time" it should be understood a very short duration in comparison with the acquisition period of a histogram. For example, an acquisition time may last 250 picoseconds and an acquisition period of a histogram may last 36 nanoseconds in order to acquire 144 bins.

Furthermore, it is also possible to acquire several histograms one after another. The overall period of acquisition of these histograms may be in the range of 15 milliseconds.

The proposed method is performed on at least one histogram. Thus, for example, the proposed method may be performed on one single histogram or on several successive histograms accumulated over the overall period of acquisition.

In an advantageous implementation, the method comprises a detection of a bin, called main bin, representative of a presence of an object and having the largest number of detected photons among the bins of the histogram, the transformed domain being defined from this main bin.

In an advantageous implementation, the transformation concerns only bins that follow the main bin in the histogram.

Furthermore, the transformation of at least one portion of the bins of the histogram in a transformed domain comprises plotting a scatter graph wherein each point is associated to a bin of the histogram. Each point is disposed according to a difference between the acquisition time of the bin associated to this point and the acquisition time of the main bin, and a ratio between the number of detected photons for the main bin and the number of detected photons for the bin associated to this point.

Thus, the graph can be a point cloud.

Of course, the graph is not necessarily plotted. Indeed, all it needs is to store the coordinates of each point in a memory. In other words, for each point, the difference and the ratio associated to this point are stored in memory.

Such a graph allows obtaining a representation of at least one portion of the bins of the histogram in a transformed domain.

Preferably, the identification of the bins representative of an object presence comprises a comparison of the position of the points in the graph with respect to a threshold function, variable according to the acquisition time of the main bin, and defining a limit between the first area and the second area of the transformed domain, and a selection of at least one bin as a bin representative of a presence of an object according to the result of the comparison.

Indeed, the threshold function allows dissociating an area of the graph comprising only points associated to bins that are not representative of the presence of an object from an area comprising only points associated to bins that are representative of the presence of an object.

Hence, the identification of the bins representative of the presence of an object is simple to implement.

In particular, a bin is selected as a bin representative of an object when the ratio between the number of detected photons for the main bin and the number of detected photons for this bin is less than the threshold defined by the threshold function for the time associated to this bin.

In particular, the threshold function allows dissociating bins representative of the presence of an object and the bin showing a large number of detected photons because of the dispersion that follows the main bin.

Of course, in order to compare the position of the points in the graph with respect to a threshold function, it is preferable to compare, for each point, the ratio associated to this point with a value of the threshold function for the difference associated to this point.

Preferably, the threshold function defines at least one segment, the comparison of the position of the points in the graph being performed with respect to the at least one segment of the threshold function. A bin is then selected as a representative bin when the point associated to this bin is located in the graph on one side of the at least one segment in the first area.

The threshold function may define one single segment or several continuous segments having different slope coefficients.

In an advantageous implementation, the at least one segment is obtained from a slope coefficient and origin coordinates stored in a memory of the time-of-flight sensor.

The slope coefficient and the origin coordinates of the at least one segment may be defined during a calibration phase of the time-of-flight sensor.

In an advantageous implementation, the method comprises, prior to the transformation, a determination of bins of the histogram that are potentially representative of a presence of an object, the transformation into the transformed domain being performed only for these bins.

The prior determination of the bins that are potentially representative of a presence of an object allows reducing the number of points to be analyzed in the transformed domain.

Such a determination of bins that are potentially representative of a presence of an object is known to persons skilled in the art. For example, the determination of bins potentially representative of an object may be implemented by applying the method described in the US patent application published under the number 2018/0253404.

According to another aspect, a time-of-flight sensor comprises an emitter configured so as to be able to emit an optical radiation and a receiver configured so as to be able to detect photons of an optical radiation. A histogram processor is configured so as to be able to plot a histogram from the number of photons detected at several successive acquisition times. The histogram comprises several bins associating a number of detected photons to an acquisition time. A processor is configured so as to be able to obtain the histogram generated by the histogram processor, transform at least one portion of the bins of the histogram into points in a domain, called transformed domain, featuring a first area containing only points associated to bins representative of an object presence and a second area having only points associated to bins not representative of an object presence, and identify bins of the histogram representative of an object presence from the points located in the first area.

Preferably, the processor is configured to determine a bin of the histogram, called main bin, representative of a presence of an object and having the largest number of detected photons among the bins of the histogram, the transformed domain being defined from this main bin.

In an advantageous embodiment, the processor is configured to perform the transformation only for bins that follow the main bin in the histogram.

In an advantageous embodiment, the processor is configured to perform the transformation of at least one portion of the bins of the histogram into a transformed domain by plotting a scatter graph wherein each point is associated to a bin of the histogram, each point being disposed according to a difference between the acquisition time of the bin associated to this point and the acquisition time of the main bin, and a ratio between the number of detected photons for the main bin and the number of detected photons for the bin associated to this point.

In an advantageous embodiment, the processor is configured to identify bins representative of an object presence by comparing the position of the points in the graph with respect to a threshold function variable according to the acquisition times of the bins and defining a limit between the first area and the second area of the transformed domain, and selecting at least one bin as a bin representative of a presence of an object according to the result of the comparison.

Preferably, the threshold function defines at least one segment. The processor is then configured to identify bins representative of an object presence by comparing the position of the points in the graph with respect to the at least one segment of the threshold function, and selecting a bin as a representative bin when the point associated to this bin is located in the graph on one side of the at least one segment in the first area.

In an advantageous embodiment, the time-of-flight sensor comprises a memory wherein a slope coefficient and origin coordinates are recorded. The slope coefficient and origin coordinates enable the processor to establish the at least one segment.

In an advantageous embodiment, the processor is configured to determine, prior to the transformation, bins of the histogram that are potentially representative of a presence of an object, the transformation being performed only for these bins.

BRIEF DESCRIPTION OF THE DRAWINGS

Other advantages and features of the invention will appear upon examining the detailed description of non-limiting implementation modes and embodiments, and from the appended drawings wherein.

DETAILED DESCRIPTION OF ILLUSTRATIVE EMBODIMENTS

Figure 1:
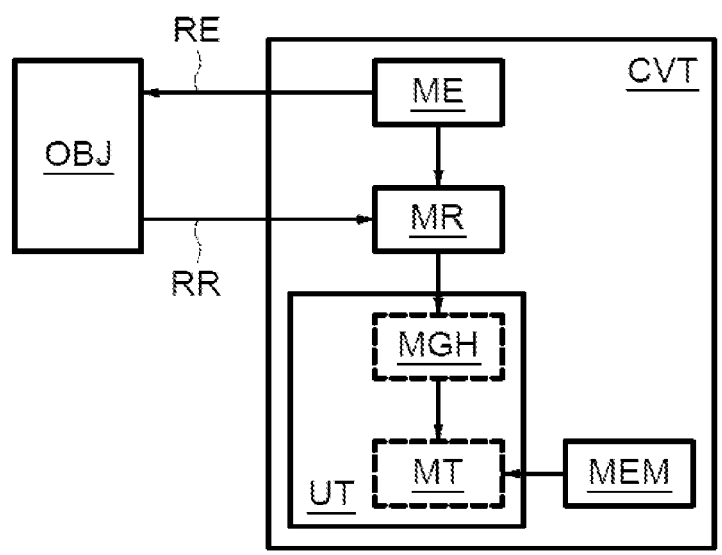
FIG. 1 illustrates a time-of-flight sensor CTV according to an embodiment of the invention.

FIG. 1 illustrates a time-of-flight sensor CTV according to an embodiment of the invention.

The time-of-flight sensor CTV comprises an emitter ME configured to emit optical radiations RE on a periodic basis.

The emitter ME may comprise a Vertical-Cavity Surface-Emitting Laser, commonly known to persons skilled in the art under the acronym "VCSEL".

If one or several object(s) OBJ are present within the field of the optical radiation, the time-of-flight sensor CTV could receive a reflected optical radiation RR resulting from a reflection of the optical radiation on the object(s) OBJ.

Thus, the time-of-flight sensor CTV comprises a receiver MR configured to receive optical radiations RR reflected by the objects OBJ within the field of view of the time-of-flight sensor.

The receiver MR comprises one or several photons detector(s), herein for example an array of single photon detectors DET of the Single Photon Avalanche Diode type (SPAD) known as such to persons skilled in the art.

The time-of-flight sensor CTV comprises histogram processor MGH configured to plot a histogram from the signals output by the array of single photon detectors. In particular, the histogram processor MGH is configured to count the number of photons detected by the receiver at several successive acquisition times.

Thus, the histogram processor MGH is configured to plot a histogram comprising different bins. Each bin associates a number of detected photos to a given acquisition time.

More particularly, a histogram is acquired over a given period. The bins of a histogram are associated to different acquisition times of the acquisition period of the histogram. The acquisition period of one histogram starts as of the time of emission of an optical radiation by the emitter and lasts until a predefined number of bins is acquired.

By "time" it should be understood a very short duration in comparison with the acquisition period of a histogram. For example, an acquisition time may last 250 picoseconds and an acquisition period of a histogram may last 36 nanoseconds in order to acquire 144 bins.

Furthermore, it is also possible to acquire several histograms one after another. The overall period of acquisition of these histograms may be in the range of 15 milliseconds.

Preferably, the histogram processor MGH comprises software implemented by a processing unit UT of the time-of-flight sensor.

For example, the processing unit UT may comprise a microprocessor.

The time-of-flight sensor also comprises a processor MT configured to perform postprocessing on the plotted histograms. The postprocessing allows determining the bins representative of the presence of an object within the field of view of the sensor. A bin representative of the presence of an object allows determining the distance between the object and the sensor by taking into account the acquisition time associated to this bin.

Preferably, the processor MT comprises software implemented by the processing unit of the time-of-flight sensor. In other words, the histogram processor MGH and the processor MT can comprise software implemented by the processing unit of the time-of-flight sensor.

In particular, the processor MT is configured to receive the histogram generated by the histogram processor MGH.

Furthermore, in order to facilitate the identification of the bins representative of the presence of an object, the histogram processor MGH is configured to carry out a transformation of at least one portion of the bins of the histogram into points in a transformed domain. The transformed domain is selected so that it features a first area containing only points associated to bins representative of an object presence and a second area having only points associated to bins not representative of an object presence.

The processor MT is configured to identify bins of the histogram representative of an object presence from the points located in the first area of the transformed domain.

More particularly, the processor MT is configured to determine a bin of the histogram, called main bin, representative of a presence of an object and having the largest number of detected photons among the bins of the histogram. The transformed domain is then defined from this main bin.

In particular, the processor MT is configured to perform the transformation of at least one portion of the bins of the histogram into a transformed domain by plotting a scatter graph wherein each point is associated to a bin of the histogram. Thus, the graph is a point cloud.

Each point relates a difference between the acquisition time of the bin associated to this point and the acquisition time of the main bin, and a ratio between the number of detected photons for the main bin and the number of detected photons for the bin associated to this point.

Hence, each point is disposed in the graph according to this deviation and this ratio.

In particular, the difference between the acquisition time of the bin associated to one point and the acquisition time of the main bin is represented in abscissas. The abscissa value of one point associated to a bin i is therefore equal to $x_i=d_i-d_1$, where $d_i$ is the acquisition time of the bin i, and $d_1$ is the acquisition time of the main bin.

Furthermore, the ratio between the number of detected photons for the main bin and the number of detected photons for the bin associated to one point is represented in ordinates. The ordinate value of one point associated to a bin i is therefore equal to $y_i=r_1/r_i$, where $r_i$ is the number of detected photons for the bin i and $r_1$ is the number of detected photons for the main bin.

Of course, the graph is not necessarily plotted. Indeed, all it needs is to store the coordinated of each point in the memory MEM. In other words, for each point, the difference and the ratio associated to this point are stored in memory.

Preferably, the processor MT is configured to perform the transformation only for bins that follow the main bin in the histograms.

Furthermore, the processor MT is configured to determine, prior to the transformation, bins of the histogram that are potentially representative of a presence of an object, the transformation being performed only for these bins.

The prior determination of the bins that are potentially representative of a presence of an object allows reducing the number of points to be analyzed in the transformed domain.

Such a determination of bins that are potentially representative of a presence of an object is known to persons skilled in the art. For example, the determination of bins potentially representative of an object may be implemented by applying the method described in the US patent application published under the number 2018/0253404.

Moreover, the processor MT is configured to identify bins representative of an object presence by comparing the position of the points in the graph with respect to a threshold function variable according to the acquisition times of the bins. Furthermore, the threshold function is defined according to the acquisition time of the main bin. The threshold functions may be defined through experimentation.

The threshold function defines at least one segment in the scatter graph. Hence, the processor is configured to identify bins representative of an object presence by comparing the position of the points in the graph with respect to the at least one segment.

In particular, the time-of-flight sensor comprises a memory MEM wherein a slope coefficient and origin coordinates are recorded. The slope coefficient and origin coordinates enable the processor to establish the at least one segment.

The threshold function allows dissociating an area of the graph comprising only points associated to bins not representative of the presence of an object of an area comprising only points associated to bins representative of the presence of an object.

In particular, the threshold function allows defining, on one side, an area of the graph comprising only points associated to bins having a number of photons due to a dispersion following the main bin and, on another side, an area comprising only points associated to bins representative of the presence of an object.

More particularly, the threshold function allows defining a threshold of a ratio between the number of detected photons for the main bin and a defined number of detected photons according to the acquisition times of the bins. Hence, this threshold varies according to the acquisition times of the bins. In particular, the later the acquisition time of a bin, the higher is the threshold to which this bin is compared. Hence, the threshold function is increasing. In other words, the slope coefficient of the at least one segment is positive.

Thus, the closest the acquisition time of a bin to that one of the main bin, the larger must be the number of detected photons for this bin so that the bin is considered as a bin representative of the presence of an object.

The processor MT is further configured to identify the bins representative of the presence of an object from the comparisons between the position of the points and the threshold function.

Figure 2:
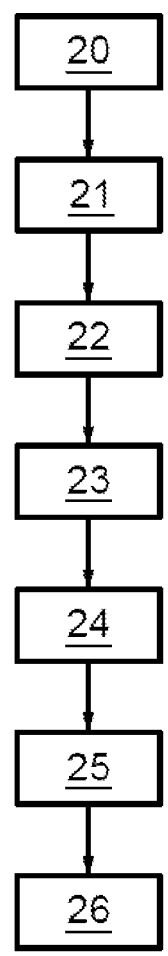
FIG. 2 represents a method for detecting a presence of at least one object within a field of view of a time-of-flight sensor.

FIG. 2 represents a method for detecting a presence of at least one object within a field of view of a time-of-flight sensor. Such a method may be implemented by the processor MT is of the time-of-flight sensor CTV illustrated in FIG. 1.

First of all, the method comprises a step 20 of obtaining a histogram wherein the processor receives a histogram generated by the histogram processor.

Thus, the histogram comprises several bins associating a number of detected photons to a given acquisition time.

Figure 3:
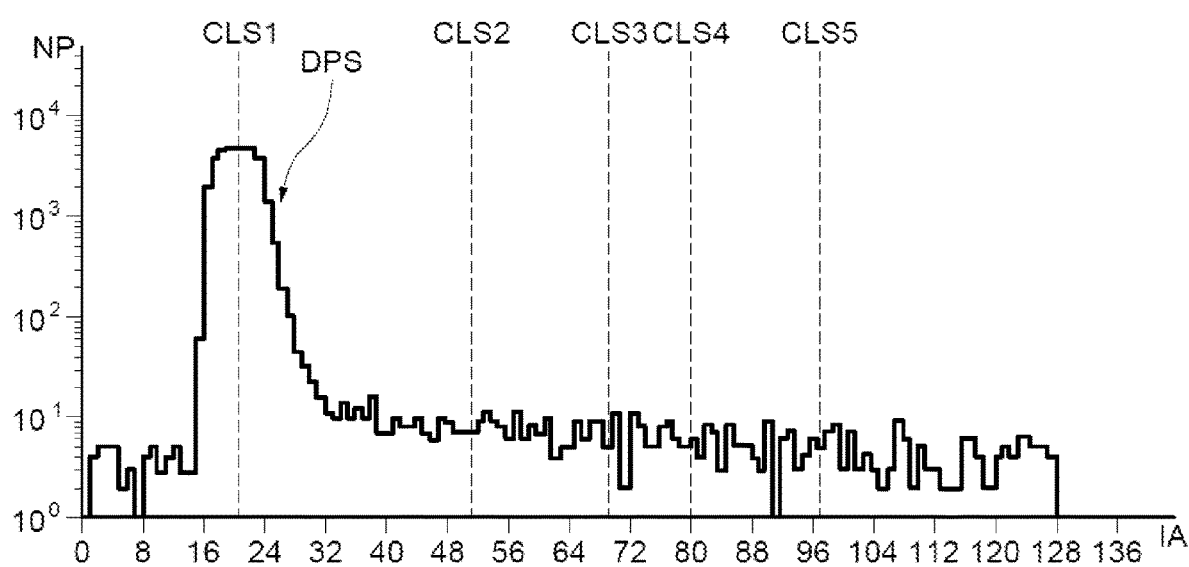
FIG. 3 illustrates a histogram HST that may be generated using embodiments.

FIG. 3 illustrates a histogram HST that may be generated by the histogram processor MGH of the time-of-flight sensor CTV. The histogram HST comprises several bins including the bins CLS1 to CLS5. The number of detected photons NP per acquisition time is represented in ordinates, the acquisition times IA being represented in abscissas.

The bin CLS1 represents the main bin. This main bin is followed by bins undergoing a dispersion DPS. The dispersion DPS is a progressive decrease of the number of detected photons for the bins that immediately follow the main bin.

Afterwards, the method comprises a step 21 of determining bins that are potentially representative of the presence of an object.

This step 21 allows preselecting the bins of the histogram that may be representative of the presence of an object for the processing that is described hereinbelow. The bins of the histogram that are not representative of the presence of an object are eliminated and will not be processed later on.

For example, the processor MT may determine that the bins CLS2 to CLS5 are potentially representative of a presence of an object within the field of view of the sensor.

Afterwards, the method comprises a step 22 of detecting the main bin of the histogram. At this step 22, the processor identifies the bin of the histogram representative of a presence of an object which comprises the largest number of detected photons among the bins of the histogram, for example the bin CLS1.

Afterwards, the method comprises a step 23, wherein the bins potentially representative of the presence of an object are selected that are associated to an acquisition time later than the acquisition time of the main bin.

The bins potentially representative of the presence of an object that are associated to an acquisition time that occurred before the acquisition time of the main bin are identified as bins representative of the presence of an object.

Indeed, these bins are not affected by the dispersion that follows the main bin.

Afterwards, the method comprises a transformation step 24 wherein the processor carries out a transformation of the bins selected at step 23 into points in a transformed domain allowing distinguishing the bins not representative of an object presence from bins representative of an object presence.

In particular, the processor plots a scatter graph, illustrating the transformed domain, wherein each point is associated to a bin selected at step 23.

As described before, each point relates a difference between the acquisition time of the bin associated to this point and the acquisition time of the main bin, and a ratio between the number of detected photons for the main bin and the number of detected photons for the bin associated to this point.

Figure 4:
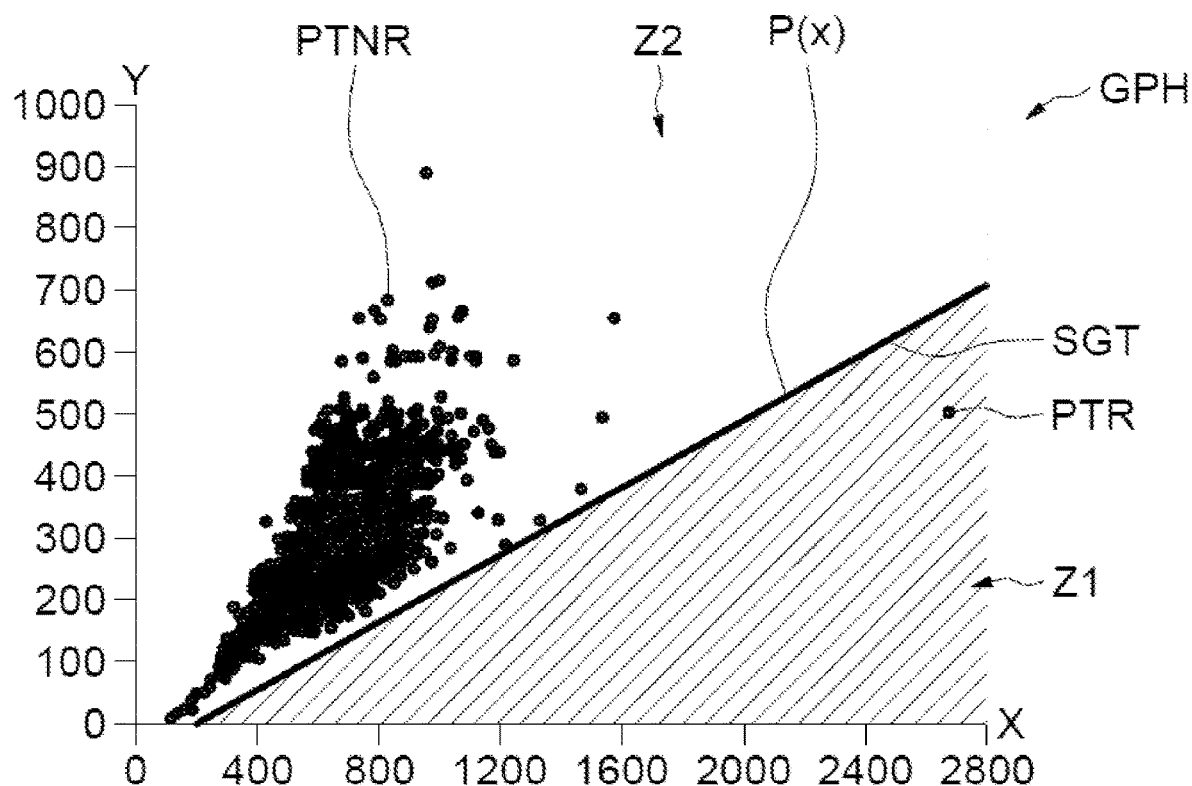
FIG. 4 schematically illustrate embodiments and implementation modes of the invention.

FIG. 4 illustrates an example of a graph GPH that may be obtained by implementing the previously-described method.

Moreover, the method then comprises a comparison step 25 wherein the position of the points in the graph is compared with a threshold function $P(x)$. The threshold function $P(x)$ depends on the acquisition time of the main bin. The threshold function $P(x)$ defines a threshold that is variable according to the acquisition time of the bin for which it is used. The threshold function $P(x)$ may be defined by at least one segment. Thus, the threshold function $P(x)$ may be defined by the processor MT from a slope coefficient and the origin coordinates of the at least one segment stored in the memory MEM.

Furthermore, some threshold functions may be defined for some usual cases involving objects of a different nature. For example, some threshold functions may be defined to process Lambertian reflective objects and other threshold functions may be defined to process specular reflective objects.

In such an embodiment, the processor determines whether the main bin is representative of the presence of a very reflective object before defining the threshold function $P(x)$.

In particular, for a point associated to a bin i, the ratio $y_i$ between the number of detected photons for the main bin and the number of detected photons for this bin i is compared with the threshold $P(x_i)$ defined for the difference between the acquisition time of the associated bin i and the acquisition time of the main bin.

This comparison allows selecting, at step 26, the bins representative of the presence of an object that follow the main bin.

In particular, if the ratio $y_i$ of the point associated to the bin i is less than the threshold $P(x_i)$, then the bin i is considered as a bin representative of the presence of an object.

In other words, if the point associated to the bin i is located below the threshold function $P(x)$, then the bin i is considered as a bin representative of the presence of an object.

Otherwise, the bin i is considered as a bin not representative of the presence of an object.

For example, in FIG. 4, only the point PTR located in the area Z1 of the graph, below the segment SGT defined by the threshold function $P(x)$, is associated to a bin representative of the presence of an object. The other points PTNR located in the area Z2 of the graph, above the segment SGT defined by the threshold function $P(x)$ are bins that are not representative of the presence of an object.

In particular, such a method allows eliminating bins having a large number of photons because of the resulting dispersion that follows the main bin.

Hence, the identification of the bins representative of the presence of an object is simple to implement.

What is claimed is:

1. A method for operating a time-of-flight sensor, the method comprising:
    emitting optical radiation from the time-of-flight sensor toward an object;
    detecting, by the time-of-flight sensor, photons from a reflection of the optical radiation from the object;
    obtaining a histogram generated by the time-of-flight sensor, the histogram comprising a plurality of bins associating a number of the detected photons to a given acquisition time;
    detecting a main bin representative of a presence of the object, the main bin having the largest number of detected photons among the bins of the histogram;
    transforming a portion of the bins of the histogram into points in a transformed domain featuring a first area containing only points associated to bins representative of the presence of the object and a second area having only points associated to bins not representative of the presence of the object, wherein transforming the portion of the bins of the histogram in a transformed domain comprises plotting a scatter graph, wherein each point in the scatter graph is associated to a bin of the histogram, each point being disposed according to a difference between the acquisition time of the bin associated to this point and the acquisition time of the main bin, and according to a ratio between the number of the detected photons for the main bin and the number of the detected photons for the bin associated to this point; and
    identifying the bins of the histogram representative of the presence of the object from the points located in the first area.

2. The method according to claim 1, wherein the transforming concerns only bins that follow the main bin in the histogram.

3. The method according to claim 1, wherein identifying the bins representative of the presence of the object comprises:
    comparing positions of the points in the graph with respect to a threshold function variable according to the acquisition times of the bins;
    defining a limit between the first area and the second area of the transformed domain; and
    selecting a bin as a bin representative of the presence of the object according to the result of the comparing.

4. The method according to claim 3, wherein the threshold function variable defines a segment;
    wherein the positions of the points are compared with respect to the segment of the threshold function; and
    wherein a bin is selected as a representative bin when the point associated to this bin is located in the graph on one side of the segment in the first area.

5. The method according to claim 4, wherein the segment is obtained from a slope coefficient and origin coordinates stored in a memory of the time-of-flight sensor.

6. The method according to claim 4, wherein selecting the bin comprises selecting a plurality of bins and wherein the threshold function variable defines a plurality of segments.

7. The method according to claim 1, further comprising, prior to the transforming, determining bins of the histogram that are potentially representative of the presence of the object, the transforming being performed only for these bins.

8. A time-of-flight sensor comprising:
an emitter configured so as to be able to emit optical radiation toward an object;
a receiver configured so as to be able to detect photons from a reflection of the optical radiation from the object;
a processing unit configured so as to be able to:
plot a histogram from the number of photons detected by the receiver at several successive acquisition times, the histogram comprising a plurality of bins associating a number of detected photons to a given acquisition time;
detect a main bin representative of a presence of the object, the main bin having the largest number of the detected photons among the bins of the histogram;
transform a portion of the bins of the histogram into points in a transformed domain that features a first area containing only points associated to bins representative of the presence of an object and a second area having only points associated to bins not representative of the presence of the object, wherein the portion of the bins of the histogram is transformed into the transformed domain by plotting a scatter graph, wherein each point in the scatter graph is associated to a bin of the histogram, each point being disposed according to a difference between the acquisition time of the bin associated to this point and the acquisition time of the main bin, and a ratio between the number of the detected photons for the main bin and the number of the detected photons for the bin associated to this point; and
identify bins of the histogram representative of the presence of the object from the points located in the first area.

9. The sensor according to claim 8, wherein the processing unit is configured to perform the transforming only for bins that follow the main bin in the histogram.

10. The sensor according to claim 8, wherein the processing unit is configured to identify bins representative of the presence of the object by:
comparing positions of the points in the graph with respect to a threshold function variable according to the acquisition times of the bins and defining a limit between the first area and the second area of the transformed domain; and
selecting at least one bin as a bin representative of the presence of the object according to the result of the comparing.

11. The sensor according to claim 10, wherein the threshold function variable defines at least one segment, the processing unit being configured to identify bins representative of the presence of the object by:
comparing the positions of the points in the graph with respect to the segment of the threshold function; and
selecting a bin as a representative bin when the point associated to this bin is located in the graph on one side of the at least one segment in the first area.

12. The sensor according to claim 11, further comprising a memory storing a slope coefficient and origin coordinates that enable the processing unit to establish the segment.

13. The sensor according to claim 8, wherein the processing unit is configured to determine, prior to the transforming, bins of the histogram that are potentially representative of the presence of the object, the transforming being performed only for these bins.

14. The sensor according to claim 8, wherein the processing unit comprises a histogram processor and a processor;
wherein the histogram processor is configured to plot the histogram from the number of photons detected at several successive acquisition times; and
wherein the processor is configured to receive the histogram from the histogram processor, transform the portion of the bins of the histogram into points in the transformed domain and identify the bins of the histogram representative of the presence of the object.

15. A time-of-flight sensor comprising:
an emitter configured to emit optical radiation toward an object;
a receiver configured to detect photons from a reflection of the optical radiation from the object;
a processing unit; and
a memory coupled to the processing unit and storing software that, when executed by the processing unit, causes the processing unit to:
obtain a histogram generated by the time-of-flight sensor, the histogram comprising a plurality of bins associating a number of the photons detected by the receiver to a given acquisition time;
detect a main bin representative of a presence of the object, the main bin having the largest number of detected photons among the bins of the histogram;
transform a portion of the bins of the histogram into points in a transformed domain that is defined from the main bin, the points featuring a first area containing only points associated to bins representative of the presence of the object and a second area having only points associated to bins not representative of the presence of the object, wherein the portion of the bins of the histogram in a transformed domain are transformed by plotting a scatter graph, wherein each point in the scatter graph is associated to a bin of the histogram, each point being disposed according to a difference between the acquisition time of the bin associated to this point and the acquisition time of the main bin, and a ratio between the number of the detected photons for the main bin and the number of the detected photons for the bin associated to this point; and
identify the bins of the histogram representative of the presence of the object from the points located in the first area.

16. The sensor according to claim 15, wherein the software causes the processing unit to identify the bins representative of the presence of the object by:
comparing the positions of the points in the graph with respect to a threshold function variable according to the acquisition times of the bins;
defining a limit between the first area and the second area of the transformed domain; and
selecting a bin as a bin representative of the presence of the object according to the result of the comparing.

17. The sensor according to claim 16, wherein the threshold function variable defines a segment;

wherein the positions of the points are compared with respect to the segment of the threshold function; and wherein a bin is selected as a representative bin when the point associated to this bin is located in the graph on one side of the segment in the first area.

18. The sensor according to claim 17, wherein the segment is obtained from a slope coefficient and origin coordinates stored in the time-of-flight sensor.

19. The sensor according to claim 17, wherein the software causes the processing unit to select the bin by selecting a plurality of bins and wherein the threshold function variable defines a plurality of segments.

20. The sensor according to claim 15, wherein the software further causes the processing unit to determine bins of the histogram that are potentially representative of the presence of the object prior to the transforming, the transforming being performed only for these bins.

* * * * *